UNITED STATES PATENT OFFICE.

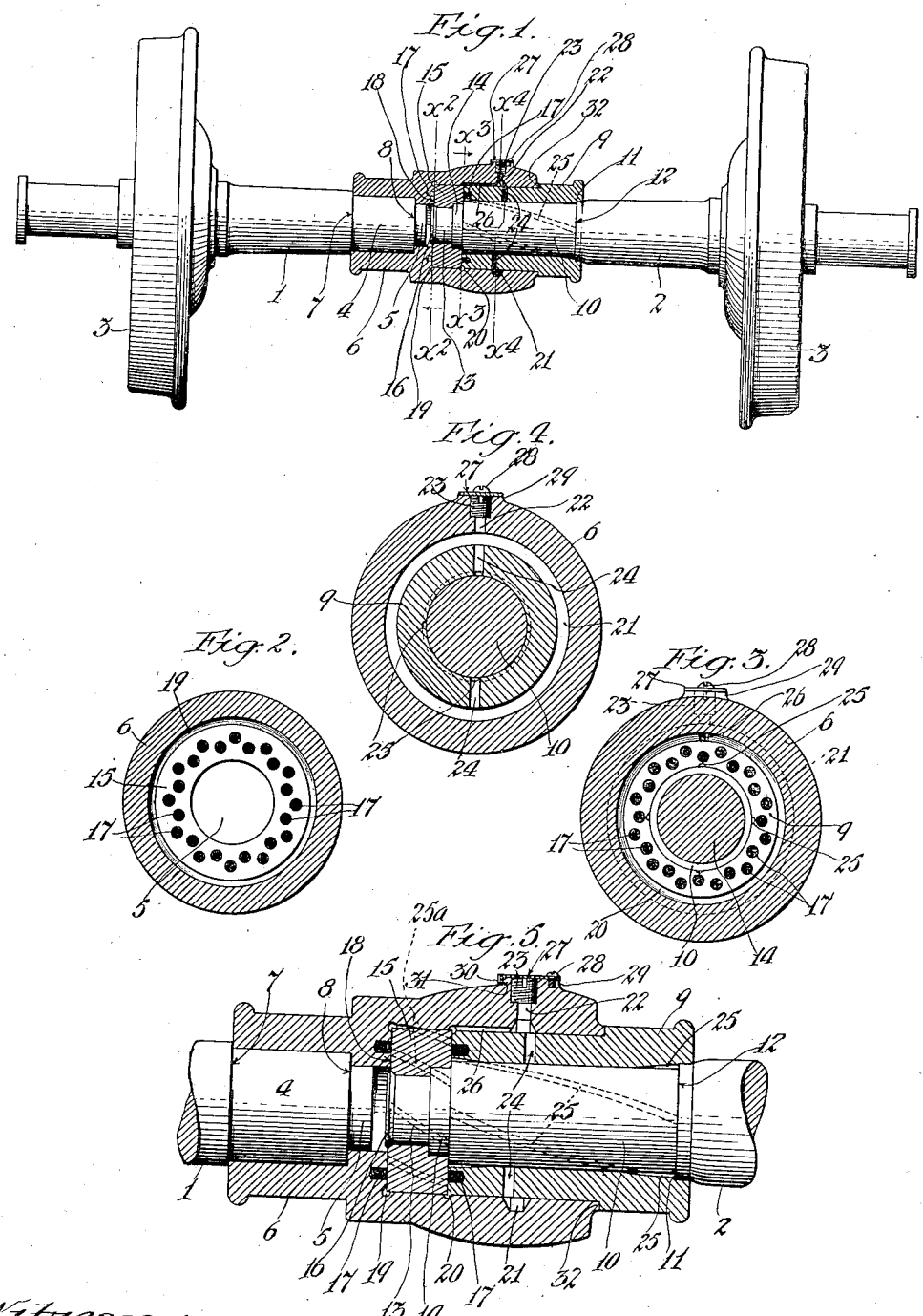

BAGSTER R. SEABROOK, OF LOS ANGELES, CALIFORNIA.

DIFFERENTIAL AXLE.

No. 910,424.   Specification of Letters Patent.   Patented Jan. 19, 1909.

Application filed May 20, 1908. Serial No. 433,968.

*To all whom it may concern:*

Be it known that I, BAGSTER R. SEABROOK, a subject of the King of Great Britain, residing at Los Angeles, in the county of Los Angeles and State of California, have invented a Differential Axle, of which the following is a specification.

This invention relates to improvements in differential car axles of a type wherein the two sections of the axle are secured together by a coupling composed of nested or telescopic parts secured together by frictional engagement or otherwise, as shown in a former application on differential axle device, filed September 30, 1907, Serial No. 395,110, allowed Feb. 14, 1908, the joint invention of myself and Frank C. Priestly. The present invention relates to details improving the construction therein, one of the main objects of the invention being to facilitate accurate machining and assembling of the parts.

Another object is to improve the lubrication by the provision of wells to retain graphite or other lubricant for thrust surfaces, and to provide means for feeding lubricant to cells without taking the axle apart.

The device includes two main collars carried by the respective axle sections, which collars are nested with each other, and one object of the invention is to provide greater lineal contact between the two collars and strengthen the same.

The device also includes an internal retaining ring which is attached to one axle section, and a further object of the invention is to improve and strengthen the attachment between the retaining ring and axle section.

Referring to the drawings:—Figure 1 is a side elevation of a differential car axle with its wheels, the coupling being shown in section. Fig. 2 is a cross section on line $x^2$—$x^2$ Fig. 1. Fig. 3 is a cross section on line $x^3$—$x^3$ Fig. 1. Fig. 4 is a cross section on line $x^4$—$x^4$ Fig. 1. Fig. 5 is a longitudinal section of the coupling on an enlarged scale.

The axle comprises two sections 1 and 2 each carrying its wheel 3. The axle 1 has an intermediate reduced end portion 4 and a short end portion 5 of less diameter than the reduced portion 4. An outer collar 6 is forced with a press-fit on the reduced end portions 4 and 5, the end or the collar abutting against a shoulder 7, and the collar having an internal flange 8 which abuts the end of the intermediate reduced portion 4, the flange also serving to space the end of the axle section 1 from the end of the axle section 2.

An inner collar 9 has a journal fit on the reduced end portion 10 of the axle section 2, and the outer end of collar 9 has a sunken shoulder 11 which abuts a shoulder 12 on the axle section 2. The axle section 2 also has a short reduced end portion 13 and a step shoulder 14. Forced thereon with a press fit is a retaining ring 15, the latter being further secured by upsetting the reduced end 13, as indicated at 16. The step shoulder 14 gives greater strength to the axle section 2 at this point. The retaining ring is secured to the axle section 2 in the manner described after the inner collar has been placed on the axle.

The inner end of inner collar 9 is provided with a series of cylindrical wells 17, which are filled with graphite or other lubricant, and are staggered as shown in Fig. 3 to enable the requisite number to be used without weakening the end of the collar and to thoroughly lubricate the thrust bearing which exists between the end of the collar and adjacent side face of the retaining ring 15. The outer collar 6 has a shoulder 18 which is also provided with similar wells 17, to lubricate the thrust bearing between shoulder 18 and the adjacent face of the retaining ring 15. The outer collar 6 is formed with an annular concave groove 19 in the corner next to the shoulder 18, which groove serves as a tool clearance and permits the collar to be accurately machined. The groove 19 also serves as a lubricant chamber for graphite. The collar 6 also has an intermediate groove 20 which is arranged at a distance from the groove 19, substantially equal to the width of the retaining ring 15, and separates the bore of the collar 6 into two portions, the inner one of which is the bearing portion in which the retaining ring 15 revolves, and the outer of which is the engaging portion into which the inner collar 9 is forced as the last operation in assembling the parts of the axle. The groove 20 also serves as a chamber for graphite. The provision of these two grooves 19 and 20 is very important, as I have found in practice that it is extremely difficult, if not impossible, to properly machine the bore of the collar 6 in such manner that the portion in which the retaining ring 15 is journaled will be perfectly finished throughout its length, and to finish the outer portion, which receives the collar 9, with a press fit. But by providing the groove 20 the two sections are clearly defined and may be machined independently of each other and finished in the exact manner required, so that each may have its exact dimensions without overlapping the other.

The collar 6 has an internal annular groove forming a lubricant chamber 21 located substantially midway between the end of the collar 6 and groove 20, and is provided with a charging hole 22 for the admission of graphite, which hole, after the graphite has been put in, is filled with a plug 23. The charging hole and plug are covered by a cover 27 which is swung on a screw 28 and fits over a boss 29, the cover being fastened when closed, by a depending spring slip 30 which engages a notch 31 in the boss. Lubricant from chamber 21 is fed to the journal bearing between the collar 9 and axle section 10 by means of diametrical passages 24 which are staggered so that they do not both deliver graphite at the same place on the axle section 2. The collar 9 is also rifled with four lubricant distributing grooves 25 which communicate with the respective passages 24, and thus means is afforded for thoroughly lubricating the entire bearing surfaces between collar 9 and the axle section 10. Collar 9 also has distributing grooves 26 extending from chamber 21 to the groove 20 and retaining ring 15. The collar 6 also has rifle grooves 25ª.

That part of the collar 9 which is forced into the collar 6 is of a slightly reduced diameter forming a shoulder 32 against which the end of the collar 6 is forced. By thus reducing this portion of the collar 9, it is possible to increase the lineal surface engagement between the two collars 6 and 9 without weakening them or adding metal, and the increased area of contact between these two collars strengthens their union at this joint and thus results in securing the two sections more firmly together.

What I claim is:—

1. A differential axle comprising two axle sections, an outer collar fixed on one section and extending beyond the end of the section and having an annular groove dividing the bore of the collar into a bearing portion and an engaging portion, an inner collar having a journal fit on the other axle section and frictionally nested in said engaging portion of the outer collar, and a retaining ring rigidly secured on the latter axle section and having a journal fit in said bearing portion of the outer collar.

2. A differential axle comprising two axle sections, an outer collar fixed on one section and extending beyond the end of the section and having an annular groove dividing the bore of the collar into a bearing portion and an engaging portion, an inner collar having a journal fit on the other axle section and frictionally nested in said engaging portion of the outer collar, and a retaining ring rigidly secured on the latter axle section and having a journal fit in said bearing portion of the outer collar, the first collar having a shoulder against which said retaining ring abuts and having an annular groove at the shoulder.

3. A differential axle comprising two axle sections, an outer collar fixed on one section and extending beyond the end of the section and having an annular groove dividing the bore of the collar into a bearing portion and an engaging portion, an inner collar having a journal fit on the other axle section and frictionally nested in said engaging portion of the outer collar, a retaining ring rigidly secured on the latter axle section and having a journal fit in said bearing portion of the outer collar, the first collar having a shoulder against which said retaining ring abuts and having an annular groove at the shoulder, and lubricant wells in said shoulder opening against the retaining ring.

4. A differential axle comprising two axle sections, an outer collar fixed on one section and extending beyond the end of the section and having an annular groove dividing the bore of the collar into a bearing portion and an engaging portion, an inner collar having a journal fit on the other axle section and frictionally nested in said engaging portion of the outer collar, a retaining ring rigidly secured on the latter axle section and having a journal fit in said bearing portion of the outer collar, the first collar having a shoulder against which said retaining ring abuts and having an annular groove at the shoulder, and lubricant wells in the end of the second named collar opening against the retaining ring.

5. A differential axle comprising two axle sections, collars on the respective sections, one axle section being rigid in its collar, the other axle section being journaled in its collar, a retaining ring on the latter axle section, the outer collar having an annular groove at each corner of the retaining ring.

6. A differential axle comprising two nested collars rigidly secured together, an axle section rigidly secured in the outer collar, an axle section journaled in the inner collar, the first axle section having a reduced end, the outer collar having an internal flange which receives said reduced end, the second axle section having a reduced end with a step shoulder, a retaining ring having two internal diameters to fit the latter reduced end and step shoulder.

7. A differential axle comprising two nested collars rigidly secured together, each collar having an external flange at its outer end, the exposed part of the inner collar between its flange and the outer collar having a single diameter, the nested portion of the inner collar having a less diameter than the exposed portion, an axle section rigidly secured in the outer collar, an axle section journaled in the inner collar, and a retaining ring on the latter axle section rotatable within the outer collar.

8. A differential axle comprising two axle sections, an outer collar fixed on one section and extending beyond the end of the section and having an annular groove dividing the bore of the collar into a bearing portion and an engaging portion, an inner collar having a journal fit on the other axle section and frictionally nested in said engaging portion of the outer collar, and a retaining ring rigidly secured on the latter axle section and having a journal fit in said bearing portion of the outer collar, the first collar having a shoulder against which said retaining ring abuts and having an annular groove at the shoulder, the outer collar having an annular lubricant chamber encircling the inner collar and having distributing grooves extending from said chamber to the first named groove.

9. A differential axle comprising two axle sections, an outer collar fixed on one section and extending beyond the end of the section and having an annular groove dividing the bore of the collar into a bearing portion and an engaging portion, an inner collar having a journal fit on the other axle section and frictionally nested in said engaging portion of the outer collar, and a retaining ring rigidly secured on the latter axle section and having a journal fit in said bearing portion of the outer collar, the first collar having a shoulder against which said retaining ring abuts and having an annular groove at the shoulder, the outer collar having an annular lubricant chamber encircling the inner collar and having distributing grooves extending from said chamber to the first named groove, the inner collar having radial passages extending from its inner bore and communicating with said chamber.

10. A differential axle comprising two axle sections, an outer collar fixed on one section and extending beyond the end of the section and having an annular groove dividing the bore of the collar into a bearing portion and an engaging portion, an inner collar having a journal fit on the other axle section and frictionally nested in said engaging portion of the outer collar, and a retaining ring rigidly secured on the latter axle section and having a journal fit in said bearing portion of the outer collar, said inner collar being rifled with a plurality of spiral grooves for holding lubricant.

11. A differential axle comprising two axle sections, an outer collar fixed on one section and extending beyond the end of the section and having an annular groove dividing the bore of the collar into a bearing portion and an engaging portion, an inner collar having a journal fit on the other axle section and frictionally nested in said engaging portion of the outer collar, a retaining ring rigidly secured on the latter axle section and having a journal fit in said bearing portion of the outer collar, the first collar having a shoulder against which said retaining ring abuts and having an annular groove at the shoulder, the outer collar having an annular lubricant chamber encircling the inner collar and having distributing grooves extending from said chamber to the first named groove, the inner collar having radial passages extending from its inner bore and communicating with said chamber.

In testimony whereof, I, have hereunto set my hand at Los Angeles, California, this 14th day of May 1908.

BAGSTER R. SEABROOK.

In presence of—
GEORGE T. HACKLEY,
FRANK L. A. GRAHAM.